United States Patent
Cocchi et al.

(10) Patent No.: US 10,736,336 B2
(45) Date of Patent: *Aug. 11, 2020

(54) METHOD AND MACHINE FOR MAKING ICE CREAM

(71) Applicant: ALI GROUP S.R.L.—CARPIGIANI, Milan (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco sul Naviglio (IT)

( * ) Notice: Subject to any disclaimer, the term of this patent is extended or adjusted under 35 U.S.C. 154(b) by 149 days.

This patent is subject to a terminal disclaimer.

(21) Appl. No.: 15/481,071

(22) Filed: Apr. 6, 2017

(65) Prior Publication Data

US 2017/0295820 A1  Oct. 19, 2017

(30) Foreign Application Priority Data

Apr. 13, 2016  (IT) .......................... 102016000038222

(51) Int. Cl.
*A23G 9/16* (2006.01)
*A23G 9/46* (2006.01)
(Continued)

(52) U.S. Cl.
CPC .............. *A23G 9/166* (2013.01); *A23G 9/163* (2013.01); *A23G 9/20* (2013.01); *A23G 9/222* (2013.01);
(Continued)

(58) Field of Classification Search
CPC ............ A23G 9/14–9/20; A23G 9/166; A23G 9/28–9/283; A23G 9/44–9/485;
(Continued)

(56) References Cited

U.S. PATENT DOCUMENTS 1,774,708 A * 9/1930 Gladish .................. A23G 9/287
425/278
1,951,694 A  3/1934 Price et al.
(Continued)

FOREIGN PATENT DOCUMENTS

EP   1068803 A1   1/2001
EP   1787524 A2   5/2007
(Continued)

OTHER PUBLICATIONS

Italian Search Report dated Nov. 15, 2016 from counterpart Italian App No. US20162571.
(Continued)

*Primary Examiner* — Drew E Becker
(74) *Attorney, Agent, or Firm* — Shuttleworth & Ingersoll, PLC; Timothy Klima

(57) ABSTRACT

A method for making ice cream including a basic flavor in which an additional flavor of a different type is inserted includes the following steps:
preparing a container for processing the basic ice cream product;
cooling and stirring a basic preparation inside processing container to make a basic ice cream product;
preparing a hermetically sealed capsule containing an additional flavor;
opening the capsule;
simultaneously transferring a portion of the basic ice cream from the processing container to the serving container and the additional flavor from the open capsule to the serving container, wherein the simultaneous transferring step comprises a step of delivering the additional flavor into a first predetermined spatial region and a step of delivering the basic ice cream into a second spatial region which contains the first spatial
(Continued)

US 10,736,336 B2

Page 2 region, so that the additional flavor is fed into the basic ice cream in the serving container.

9 Claims, 3 Drawing Sheets

(51) Int. Cl.
*A23G 9/50* (2006.01)
*A23G 9/48* (2006.01)
*A23G 9/24* (2006.01)
*A23G 9/28* (2006.01)
*B65D 85/78* (2006.01)
*B65D 85/60* (2006.01)
*A23G 9/20* (2006.01)
*A23G 9/22* (2006.01)

(52) U.S. Cl.
CPC .............. *A23G 9/24* (2013.01); *A23G 9/282* (2013.01); *A23G 9/283* (2013.01); *A23G 9/287* (2013.01); *A23G 9/288* (2013.01); *A23G 9/46* (2013.01); *A23G 9/48* (2013.01); *A23G 9/485* (2013.01); *A23G 9/506* (2013.01); *B65D 85/60* (2013.01); *B65D 85/78* (2013.01)

(58) Field of Classification Search
CPC .. A23G 2220/20–2220/22; A23G 9/46; A23G 9/04; A23G 9/506; A23G 9/24; A23G 9/288; A23G 9/106; A23G 9/222; A23G 9/224; A23G 9/287; A23G 9/12; A23G 9/163; B65D 83/0005–83/0077; B65D 83/0094; B65D 85/60; B65D 85/78
USPC .......................... 426/122–123, 524, 515, 115
See application file for complete search history.

(56) References Cited

U.S. PATENT DOCUMENTS

| | | | |
|---|---|---|---|
| 2,284,651 A | 6/1942 | Gundlach et al. | |
| 2,347,083 A | 4/1944 | Connellee et al. | |
| 2,667,846 A | 2/1954 | Grumbly et al. | |
| 3,945,614 A | 3/1976 | Suzuki et al. | |
| 4,793,520 A | 12/1988 | Gerber | |
| 4,881,663 A * | 11/1989 | Seymour | A23G 9/282 222/132 |
| 5,464,119 A * | 11/1995 | Giuseppe | A23G 7/0025 221/156 |
| 5,505,336 A * | 4/1996 | Montgomery | B67B 7/28 222/326 |
| 5,727,713 A | 3/1998 | Kateman et al. | |
| 5,758,571 A | 6/1998 | Kateman et al. | |
| 5,957,040 A * | 9/1999 | Feola | A23G 9/163 220/630 |
| 6,068,875 A | 5/2000 | Miller et al. | |
| 6,453,803 B1 * | 9/2002 | Sodeyama | A23G 9/20 222/145.3 |
| 7,604,826 B2 * | 10/2009 | Denisart | B65D 85/8043 426/112 |
| 2004/0238576 A1 | 12/2004 | McGill | |
| 2006/0255066 A1 * | 11/2006 | Kannar | A23G 9/045 222/145.3 |
| 2007/0110872 A1 | 5/2007 | Gerber | |
| 2007/0275131 A1 | 11/2007 | Bertini et al. | |
| 2007/0295750 A1 * | 12/2007 | Cocchi | A23G 9/045 222/145.6 |
| 2011/0110180 A1 * | 5/2011 | Snider | A47J 31/407 366/142 |
| 2012/0074176 A1 * | 3/2012 | Sullivan | A61M 15/0028 222/541.2 |
| 2012/0097705 A1 | 4/2012 | Py | |
| 2012/0217264 A1 * | 8/2012 | Cocchi | A23G 9/04 222/95 |
| 2012/0312049 A1 | 12/2012 | Downs et al. | |
| 2013/0045310 A1 | 2/2013 | Ricco et al. | |
| 2014/0335232 A1 | 11/2014 | Beth Halachmi | |
| 2015/0344219 A1 * | 12/2015 | Bartoli | B65D 85/8043 426/115 |
| 2016/0052706 A1 * | 2/2016 | Talon | B65D 85/8043 426/115 |
| 2016/0107831 A1 * | 4/2016 | Talon | A47J 31/407 426/115 |
| 2016/0128353 A1 | 5/2016 | Cocchi et al. | |
| 2016/0165921 A1 | 6/2016 | Ando et al. | |
| 2016/0192675 A1 | 7/2016 | Abu-Ali | |
| 2016/0214787 A1 * | 7/2016 | Iotti | B65D 85/8043 |
| 2016/0302443 A1 | 10/2016 | Lazzarini et al. | |
| 2016/0316781 A1 * | 11/2016 | Zappoli | A23G 9/28 |
| 2016/0353767 A1 * | 12/2016 | Cocchi | A23G 9/08 |
| 2017/0112165 A1 | 4/2017 | Cocchi et al. | |
| 2017/0215456 A1 * | 8/2017 | Noth | A23G 9/282 |
| 2017/0295820 A1 | 10/2017 | Cocchi et al. | |
| 2017/0360061 A1 | 12/2017 | Fonte | |
| 2018/0305115 A1 * | 10/2018 | Bartoli | B65D 85/8043 |

FOREIGN PATENT DOCUMENTS

| | | |
|---|---|---|
| EP | 2189067 A1 | 5/2010 |
| EP | 2409931 A1 | 1/2012 |
| EP | 2505070 A1 | 10/2012 |
| GB | 1165448 A | 10/1969 |
| GB | 1423123 A | 1/1976 |
| WO | WO9413154 A2 | 6/1994 |
| WO | WO2014053614 A1 | 4/2014 |
| WO | WO2015022678 A1 | 2/2015 |
| WO | WO2015024798 A1 | 2/2015 |

OTHER PUBLICATIONS

European Office Action from related European App No. ep16172275.6.
Unknown: "Come preparare il gelato variegato alla Nutella", Mar. 15, 2015, XP002750679, Retrieved from the Internet: URL:https://web.archive.org/web/20150316022547/http://guidecucina.pianetadonna.it.come-preparare-il-gelato-variegato-alla-nutella-231122.htm, Retrieved on Nov. 9, 2015.
Italian Search Report dated Nov. 9, 2015 from related Italian App No. UB20151198.
Cocchi—U.S. Appl. No. 15/168,764, filed May 31, 2016.
European Office Action dated Dec. 21, 2018 for counterpart European Patent Application No. 17165207.7.

* cited by examiner

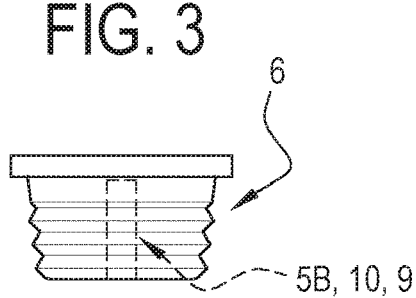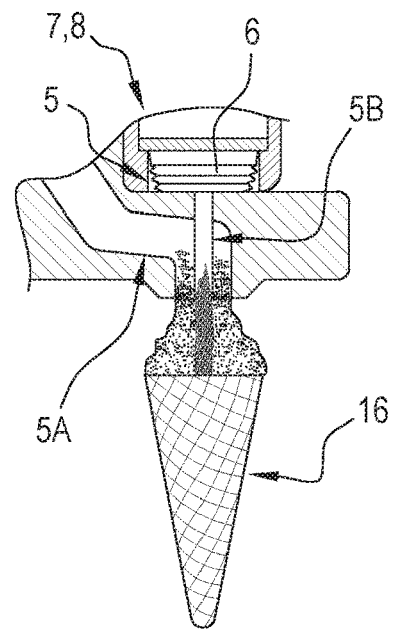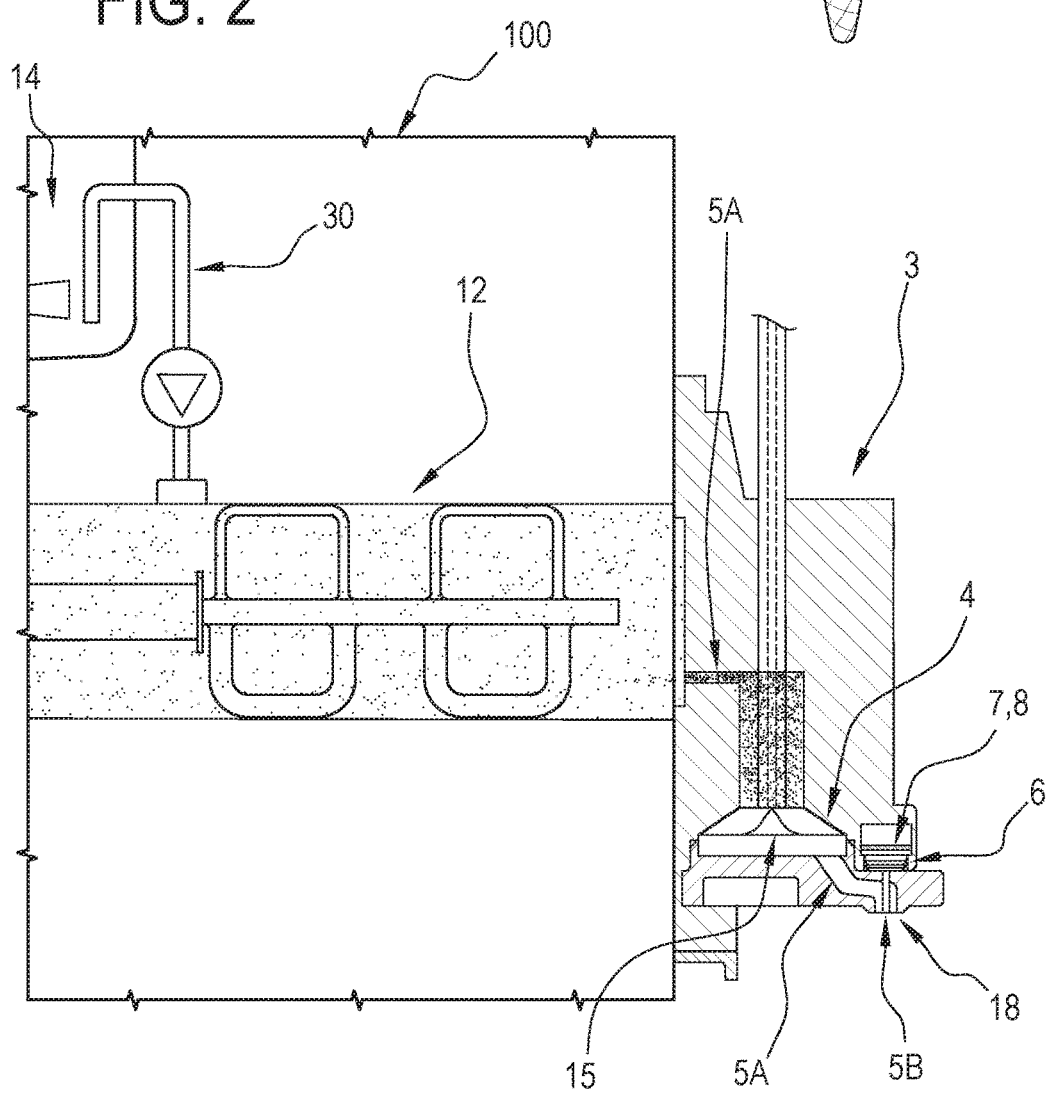

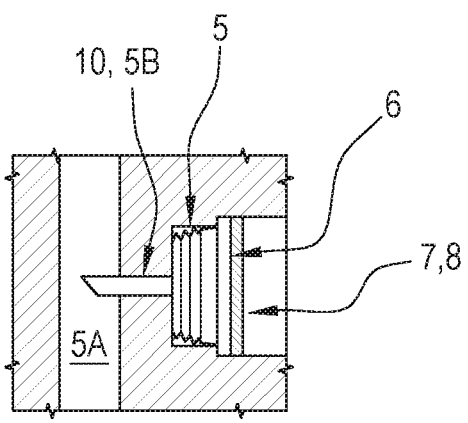
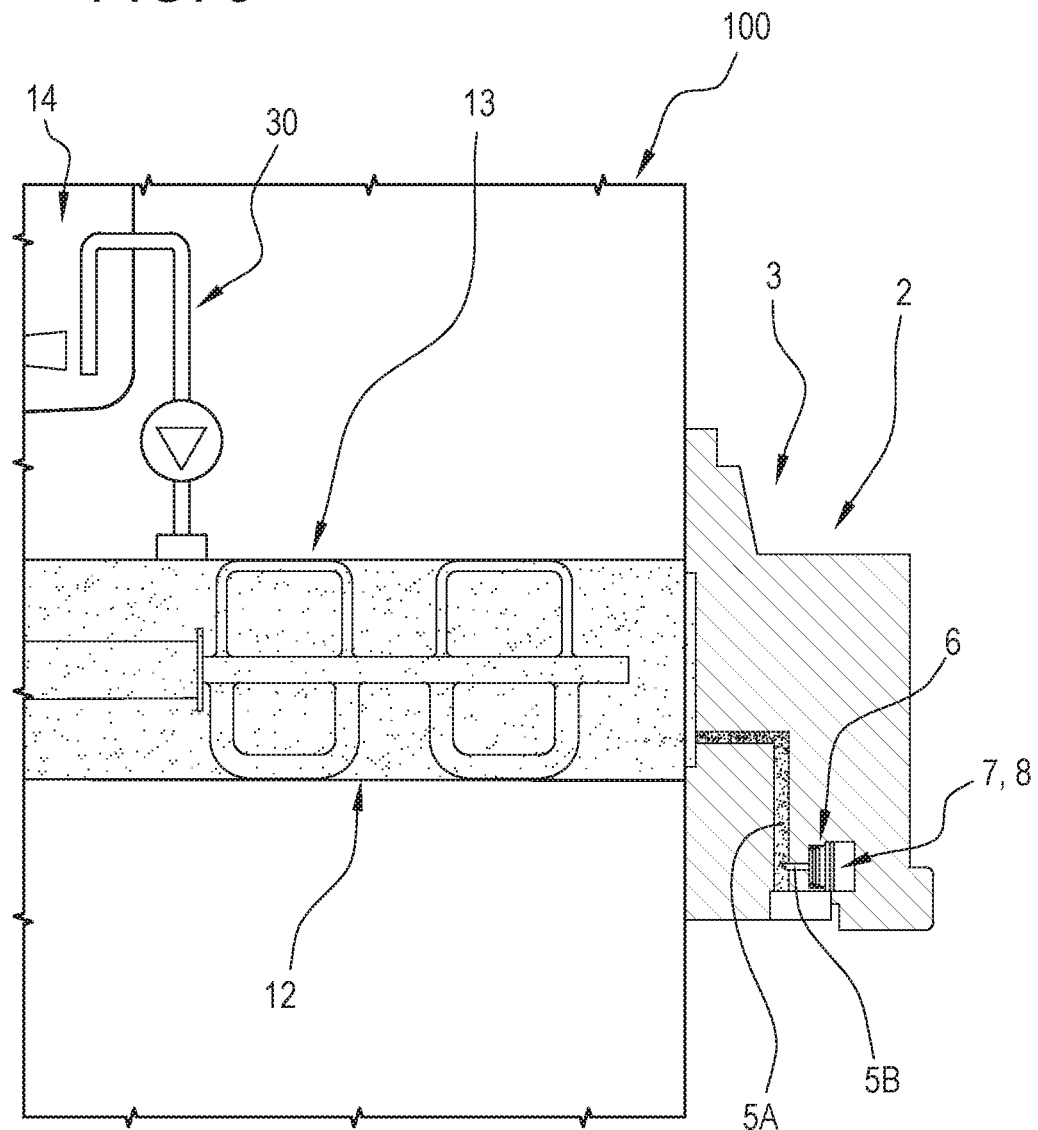

METHOD AND MACHINE FOR MAKING ICE CREAM

This application claims priority to Italian Patent Application No. 102016000038222 filed Apr. 13, 2016, the entirety of which is incorporated by reference herein.

BACKGROUND OF THE INVENTION

This invention relates to a method and a machine for making ice cream containing a center made from a different basic product (preferably a chocolate center).

Known in the trade are ice creams consisting of a basic flavor (the basic ice cream, preferably a soft ice cream) into which a center having a different flavor or made of a different material is inserted.

As is known, a need which is strongly felt by operators in the trade is that of having a device for dispensing an ice cream of this kind which allows obtaining a particularly high degree of food safety, that is to say, which allows reducing potential risks of contaminating the ice cream product of this kind while it is being processed.

SUMMARY OF THE INVENTION

The aim of this invention is to meet the above mentioned need by providing a method and a machine for making ice cream to meet the above mentioned need.

More specifically, this invention has for an aim to provide a method and a machine which allow dispensing and making very easily an ice cream consisting of a basic flavor into which a center having a different flavor or made of a different material is inserted (thus creating a product with a different "filling"), avoiding all risks of accidentally contaminating the product being processed.

The invention also has for an aim to provide a method and a machine which allow making and serving very quickly and easily ice cream consisting of a basic flavor into which a center having a different flavor or made of a different material is inserted.

BRIEF DESCRIPTION OF THE DRAWINGS

The technical features of the invention, with reference to the above aims, are clearly described in the annexed claims and its advantages are more apparent from the detailed description which follows, with reference to the accompanying drawings which illustrate a non-limiting embodiment of the invention and in which:

FIG. 2 shows a schematic view, partly in cross section, of a first embodiment of the machine of FIG. 1;

FIG. 3 is a schematic view of a capsule that can be used in the machine of this invention;

FIG. 4 shows a schematic cross-sectional view of a detail of the machine of FIG. 2;

FIG. 5 shows a schematic cross-sectional view of a detail of a second embodiment of the machine of this invention;

FIG. 6 shows a schematic cross-sectional view of a detail of the machine of FIG. 5.

DESCRIPTION OF THE PREFERRED EMBODIMENTS

Figure 1:
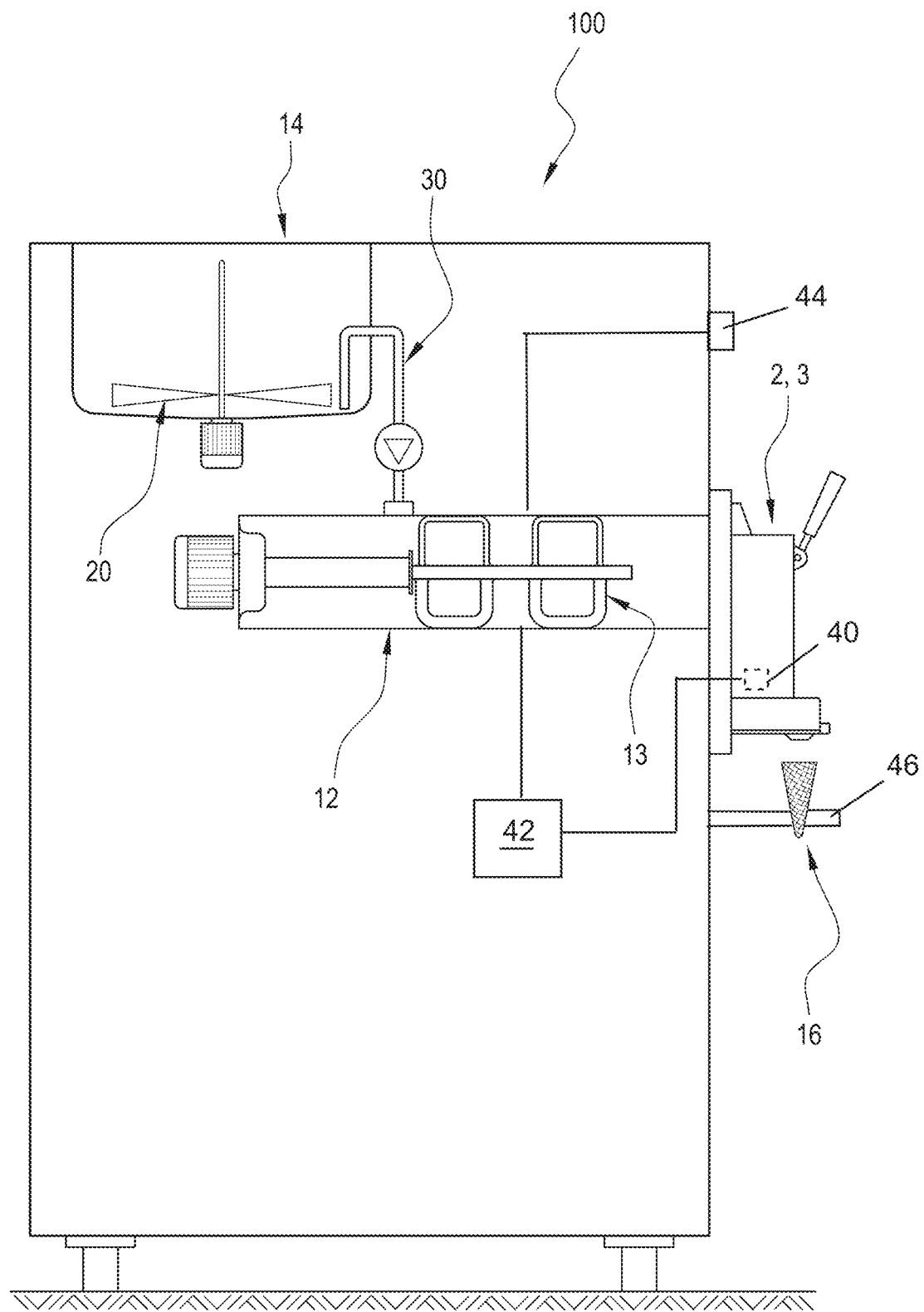
FIG. 1 is a schematic side view of a machine according to this invention.

With reference to the accompanying drawings, the numeral 100 denotes a (preferably soft) ice cream machine designed to make ice cream (preferably soft ice cream).

The reference numeral 2, on the other hand, denotes an ice cream dispensing device forming part of the ice cream making machine 100.

The device 2 is equipped with a dispensing head 3 (defined by a base unit), which comprises:

conduit 5A for delivering a basic ice cream product and configured to deliver the basic ice cream product into a second predetermined spatial region where (in use) a serving container 16 is located;

a seat 5 for receiving a capsule 6 containing an additional flavor;

a transfer conduit 5B configured to transfer the additional flavor extracted from the capsule 6, where the transfer conduit 5B is positioned to deliver the additional flavor into a first spatial region contained in the second spatial region, so that the additional flavor is fed into the basic ice cream in the serving container 16.

It should be noted that the term "region" is used in this description to mean a three-dimensional region of space.

It should be noted that the positions of the delivery conduit 5A and transfer conduit 5B relative to each other are such that the additional flavor is placed inside the basic ice cream in the serving container 16.

It should be noted that the capsule 6 is a hermetically sealed, disposable receptacle containing an additional flavor (preferably chocolate).

Preferably, the walls of the capsule 6 are made of a laminated metallic material (for example, a thin aluminum sheet) or plastic.

Preferably, the capsule 6 has side walls which are adapted to be squeezed.

In the embodiment of FIG. 2, the dispensing device 2 also comprises:

a mixing chamber 4;

a mixing element 15 positioned inside the mixing chamber 4, configured to be driven in rotation to mix, inside the mixing chamber 4, the basic ice cream and the additional flavor to produce a finished ice cream product, which is defined by the sum of the basic ice cream and the additional flavor disposed inside the basic ice cream;

an outlet opening 18 connected to the mixing chamber 4 to transfer the ice cream product to the outside of the mixing chamber 4.

In the embodiment illustrated in FIG. 4, the delivery conduit 5A and the transfer conduit 5B are directed downwards, defining two bottom openings.

It should be noted, in particular, that the transfer conduit 5B is disposed inside the delivery conduit 5A.

In this embodiment, the delivery conduit 5A delivers the basic ice cream directly into a serving container 16 below it and the transfer conduit 5B simultaneously delivers the additional flavor.

The positions of the delivery conduit 5A and transfer conduit 5B relative to each other are such that the basic ice cream is placed outside the additional flavor so that the additional flavor constitutes a center placed inside the basic ice cream.

It should be noted that according to this aspect, the machine 100 may comprise a supporting device 46 for holding the serving container 16 and having a seat for supporting the serving container 16.

It should be noted that according to another aspect, this supporting seat might also be vibratory: according to this aspect, the machine 100 comprises a vibration generating device configured to generate mechanical vibrations of any kind and to transmit them to the supporting seat.

The container 16 may be an ice cream cone, a cup or any receptacle suitable for holding the ice cream.

The machine 100 for making (preferably soft) ice cream, comprises:

a cooling system, provided with a heat exchanger associated with the processing container 12, for exchanging heat with (and also cooling), the processing container 12;

a stirrer 13 positioned inside the processing container 12.

With reference to the delivery conduit 5A, it should be noted that this conduit is connected (at one end) to the processing container 12 to receive basic ice cream therefrom.

With reference to the dispensing device 2, according to one aspect, the stop element 7 for the capsule 6 comprises a compression element 8 which is movable between a non-operating position and a compression operating position in which it comes into contact with and squeezes the capsule 6 inserted in the receiving seat 5.

According to this aspect, the capsule 6 is preferably deformable, that is to say, is provided with one or more preferential lines of deformation.

According to another aspect, a piercing element 9 is provided which is configured to pierce the capsule 6 inserted in the receiving seat 5.

Preferably, the piercing element 9 is provided with a tip which is configured to pierce the capsule 6.

According to another aspect, illustrated in FIG. 3, the capsule 6 contains an internal straw 10 which protrudes when the capsule is compressed.

It should be noted that the straw 10 defines the aforementioned second, transfer conduit 5B.

According to this aspect, the piercing element 9 may be constituted by the straw 10.

The dispensing device also comprises an actuator for the relative movement of the piercing element 9 and the capsule 6, to allow moving the piercing element 9 and the capsule 6 relative to each other between a spaced-apart position and a close-together position of mutual contact.

The above mentioned actuator preferably operates on the piercing element 9 to move it from a position of non-interference with the wall of the capsule 6 to a position where it is in contact with and pierces the wall of the capsule 6.

Alternatively, the actuator operates on the capsule 6 to move it from a position of non-interference with the piercing element 9 to a position where it is in contact with the piercing element 9.

According to one aspect, the piercing element 9 is internally hollow; this allows the additional flavor (preferably a syrup to pass through it and to be transferred to the second, transfer conduit 5B.

It should be noted, according to another aspect, that the mixing element 15 is provided with one or more vanes.

The mixing element 15 is driven in rotation by a respective actuator (not illustrated), for example a motor.

According to another aspect, the dispensing device 2 also comprises a first shutter 40, designed to close the delivery conduit 5A.

It should be noted that, according to another aspect, the machine 100 is preferably equipped with a drive and control unit 42.

It should be noted that the drive and control unit 42 is preferably connected to the first shutter 40 in order to open and close it.

Preferably, the machine 100 comprises a user interface 44 provided with control commands.

It should be noted that the control commands preferably allow driving the first shutter (to open/close).

According to another aspect, the dispensing head 3 is provided with an opening 11 designed to allow the capsule 6 to be inserted into the relative containing seat 5 (preferably from the front or from above).

In one embodiment, the capsule 6 comprises a chocolate type product.

The machine 100 comprises, as illustrated in FIG. 1 (but this aspect also applies to the embodiment of FIG. 5), a further container 14 for containing a basic preparation for the basic ice cream and a transfer duct 30 connectable to the further containment container 14 and to the processing container 12 to transfer the basic preparation from the containment container 14 to the processing container 12.

Preferably, the further container 14 for containing a basic preparation comprises a stirrer 20 mounted inside the further container 14 and configured to rotate in such a way as to mix and stir the basic preparation.

In order to make the soft ice cream, the machine 100 may also comprise an air intake device for feeding air into the processing container 12.

The air intake device may comprise a rotary element which allows blowing air into the processing container 12 in order to allow implementing the process for making ice cream of the soft type.

Indeed, as is known, soft ice cream, compared to traditional ice cream, contains a higher percentage of air per unit volume.

Alternatively,—according to what is known as the "gravity method"—the air intake device may comprise a connecting duct between the containment container 14 and the processing container 12 in order to transfer the product from one container to the other.

The connecting duct is provided with a first opening at the containment container 14 to receive product from the containment container 14 and a second opening above the containment container 14 to allow air to be taken into the duct itself.

According to this aspect, rotating the stirrer inside the processing container 12 allows transferring air and basic product into the processing container 12.

Advantageously, the dispensing device 2 described above is applicable to a plurality of machines to allow retrofitting existing machines.

It should also be noted that the dispensing device 2 allows increasing food safety, since the capsule 6 is substantially of the disposable type: this avoids keeping the product making up the additional flavor inside the machine 100 for long periods of time.

In effect, the capsule 6 is placed in the machine 100 only when necessary, that is to say, when the ice cream (consisting of the basic ice cream plus the additional flavor) is actually dispensed.

Further, according to another aspect, the device proposed advantageously allows optimizing the distribution of the additional flavor relative to the basic flavor.

It should be noted that the device proposed is particularly simple and compact, unlike prior art solutions which had a complex system for transporting and distributing the syrups.

Advantageously, according to this aspect, the machine 100 (equipped with the dispensing device 2) is particularly compact.

Also defined according to the invention is a method for making ice cream comprising a basic flavor in which an additional flavor of a different type (preferably chocolate) is inserted.

The method comprises the following steps:

preparing a container 12 for processing the basic ice cream product;

cooling and stirring a basic preparation inside the processing container 12 to make a basic ice cream product;

preparing a hermetically sealed capsule 6 containing an additional flavor;

opening the capsule 6;

simultaneously transferring a portion of the basic ice cream from the processing container 12 to the serving container 16 and the additional flavor from the open capsule 6 to the serving container 16, where the simultaneous transferring step comprises a step of delivering the additional flavor into a first predetermined spatial region and a step of delivering the basic ice cream into a second spatial region which contains the first spatial region, so that the additional flavor is fed into the basic ice cream in the serving container (16).

It should be noted that the fact that the second spatial (delivery) region contains the first spatial (delivery) region means that the basic flavor in the serving container 16 encloses the additional flavor (which thus constitutes the center of the basic product).

Preferably, the additional flavor of a different type comprises chocolate and/or at least one syrup (still more preferably, it consists of chocolate).

Advantageously, this allows preparing an ice cream with a chocolate center.

According to yet another aspect, the step of preparing a hermetically sealed capsule 6 comprises a step of preparing a capsule 6 which is internally provided with a straw 10, and the step of opening the capsule 6 comprises a step of causing the straw 10 to protrude from the outside of the capsule 6, and where the step of delivering the additional flavor comprises a step of delivering the additional flavor through the straw 10.

According to yet another aspect, the method comprises a step of compressing and squeezing the capsule 6 in order to open it and/or to allow transferring the additional flavor into the serving container 16.

According to yet another aspect, the method comprises a step of preparing a straw 10 and a step of coupling the straw 10 to the capsule 6 in such a way that an internal cavity of the straw 10 is in fluid communication with the capsule 6 containing the additional flavor.

According to yet another aspect, the step of simultaneously transferring a portion of the basic ice cream from the processing container 12 to a serving container 16 and the additional flavor from the open capsule 6 to the serving container 16 comprises a step of injecting a pressurized fluid into the open capsule 6.

Preferably, the pressurized fluid is air.

According to another aspect, the step of transferring the additional flavor from the open capsule 6 to the basic ice cream product comprises a step of squeezing the capsule 6 to cause the additional flavor to come out of the open capsule 6 and the additional flavor to be transferred to (more precisely to the inside of) the basic ice cream product.

According to yet another aspect the step of opening the capsule 6 comprises a step of preparing a piercing element 9 and a further step of using the piercing element 9 to pierce the walls of the capsule 6 in order to open it.

Preferably, the piercing element 9 is hollow inside (that is to say, it is a straw 10) and the step of simultaneously transferring a portion of basic ice cream product from the processing container 12 to a serving container 16 and transferring the additional flavor from the open capsule 6 to the basic ice cream product comprises a step of extracting the additional flavor from the capsule 6 using the piercing element 9.

It should be noted that the serving container 16 may be a container of any kind: a cone, a cup and so on.

According to yet another aspect, the additional flavor is transferred into the basic ice cream during dispensing or delivery or transfer of the basic ice cream into the serving container 16.

In effect, it should be noted that the basic ice cream and the additional flavor are substantially transferred simultaneously.

According to another aspect, the step of simultaneously transferring a portion of basic ice cream product from the processing container 12 to a serving container 16 and transferring the additional flavor from the open capsule 6 to the basic ice cream product comprises a step of transferring the portion of basic ice cream product and the additional flavor into a mixing chamber 4, to mix the basic ice cream product and the additional flavor inside the mixing chamber 4, and a subsequent step of delivering the basic ice cream product and the additional flavor defining the ice cream from the mixing chamber 4 into the serving container 16.

According to yet another aspect, the step of preparing a hermetically sealed capsule 6 containing an additional flavor comprises a step of preparing a hermetically sealed capsule 6 containing a syrup constituting the additional flavor.

What is claimed is:

1. A method for making ice cream comprising a basic flavor in which a different additional flavor is inserted, the method comprising the following steps:

providing a machine for making ice cream, comprising:
a body;
a processing container for processing a basic ice cream product;
a stirrer mounted inside the processing container;
the processing container and the stirrer positioned in an interior of the body;
a dispensing head positioned on an exterior of the body, comprising:
a receiving seat for receiving a hermetically sealed capsule that contains the different additional flavor;
a piercing element including a hollow interior;
a delivery conduit for delivering the basic ice cream product;
a transfer conduit for delivering the different additional flavor from the capsule;
wherein an end portion of the transfer conduit is positioned within a first spatial region and an end portion of the delivery conduit forms a second spatial region which encloses the first spatial region,
wherein the end portion of the transfer conduit and the end portion of the delivery conduit are oriented to flow along a same downward direction;
wherein the receiving seat is positioned adjacent the end portion of the delivery conduit;
cooling and stirring a basic preparation inside the processing container using the stirrer to obtain the basic ice cream product;
preparing the capsule containing the different additional flavor;
opening the capsule;
preparing a serving container;
providing a supporting device including a seat for supporting and holding the serving container;

placing the serving container in the seat;
simultaneously transferring a portion of the basic ice cream product from the processing container to the serving container through the delivery conduit and the different additional flavor from the open capsule through the transfer conduit to the serving container,
wherein the simultaneously transferring step comprises a step of delivering the different additional flavor into the first spatial region and a step of delivering the basic ice cream product into the second spatial region which encloses the first spatial region, so that the different additional flavor is fed into an interior of the basic ice cream product in the serving container;
wherein the simultaneously transferring step comprises a step of injecting a pressurized fluid into the open capsule to act on the different additional flavor inside the capsule to force the different additional flavor outside of the capsule;
sending an opening command via a user interface to a drive and control unit;
causing the drive and control unit to act on the opening command to open a first shutter to allow delivery of the basic ice cream product through the delivery conduit;
wherein the pressurized fluid is air;
wherein the step of opening the capsule comprises a step of piercing a wall of the capsule with the piercing element to open the capsule with the piercing element;
wherein the simultaneously transferring step comprises the pressurized air acting on the different additional flavor inside the capsule to force the different additional flavor outside of the capsule through the hollow interior of the piercing element;
wherein the transferring of the portion of the basic ice cream product from the processing container to the serving container is done along a same direction as the transferring of the different additional flavor from the open capsule to the serving container.

2. The method according to the claim 1, wherein the different additional flavor is selected from at least one of chocolate, and syrup.

3. The method according to claim 1, wherein the step of preparing a hermetically sealed capsule comprises a step of preparing a capsule which internally includes a straw, and the step of opening the capsule comprises a step of causing the straw to protrude outside of the capsule, and wherein the step of delivering the different additional flavor comprises a step of delivering the different additional flavor through the straw.

4. The method according to claim 1, comprising a step of compressing and squeezing the capsule to open the capsule and transfer the different additional flavor into the serving container.

5. The method according to claim 1, comprising a step of preparing a straw and a step of coupling the straw to the capsule such that an internal cavity of the straw is in fluid communication with an interior of the capsule containing the different additional flavor.

6. The method according to claim 1, wherein the piercing element is a straw.

7. A machine for making ice cream, comprising:
an ice cream dispensing device, comprising:
a body;
a supporting device including a seat for supporting and holding a serving container;
a dispensing head positioned on an exterior of the body, comprising:
a delivery conduit for delivering a basic ice cream product and configured to deliver the basic ice cream product into a second spatial region where the serving container is located by the seat;
a receiving seat for receiving a capsule containing a different additional flavor;
a transfer conduit configured to transfer the different additional flavor extracted from the capsule, where the transfer conduit is positioned to deliver the different additional flavor into a first spatial region enclosed by the second spatial region, so that the different additional flavor is fed into an interior of the basic ice cream product in the serving container;
a first shutter positioned in the delivery conduit to open and close the delivery conduit;
a piercing element including a hollow interior for piercing a wall of the capsule to open the capsule;
wherein an end portion of the transfer conduit is positioned within the first spatial region and an end portion of the delivery conduit forms the second spatial region which encloses the first spatial region, wherein the end portion of the transfer conduit and the end portion of the delivery conduit are oriented to flow along a same downward direction;
a source of pressurized fluid connected to an injection element for injecting the pressurized fluid into the open capsule to act on the different additional flavor inside the capsule to force the different additional flavor outside of the capsule;
a processing container for processing the basic ice cream product;
a cooling system including a heat exchanger thermally connected with the processing container, for exchanging heat with, and thus cooling, the processing container;
a stirrer mounted inside the processing container, wherein positions of the delivery conduit and transfer conduit relative to each other are such that the basic ice cream product is placed outside the different additional flavor;
the processing container, cooling system and stirrer positioned in an interior of the body;
a drive and control unit;
a user interface operatively connected to a drive and control unit for transmitting a an opening command to the drive and control unit;
the drive and control unit configured to receive the opening command and based on the opening command, act on the first shutter to open the first shutter to allow delivery of the basic ice cream product through the delivery conduit;
wherein the pressurized fluid is air;
wherein the pressurized air acts on the different additional flavor inside the capsule to force the different additional flavor outside of the capsule through the hollow interior of the piercing element.

8. The machine according to claim 7, wherein the dispensing device comprises at least one stop element for the capsule when inserted into the receiving seat and configured to abut against the capsule in such a way as to cause the capsule to open.

9. The machine according to claim 8, wherein the at least one stop element for the capsule comprises a compression element movable between a non-operating position and an operating compressing position where the compression element abuts against and squeezes the capsule inserted in the receiving seat.

* * * * *